United States Patent [19]

Matsuyama

[11] Patent Number: 4,750,593
[45] Date of Patent: Jun. 14, 1988

[54] DISC BRAKE FOR SERVICE COMBINED WITH PARKING OPERATION

[75] Inventor: Toshio Matsuyama, Kuki, Japan

[73] Assignee: Akebono Brake Industry Co., Ltd., Tokyo, Japan

[21] Appl. No.: 875,734

[22] Filed: Jun. 18, 1986

[30] Foreign Application Priority Data

Jun. 20, 1985 [JP]  Japan ............................ 60-93384[U]

[51] Int. Cl.⁴ ...................... F16D 55/08; F16D 65/14
[52] U.S. Cl. ................................ 188/72.7; 188/106 F
[58] Field of Search .................... 188/71.5, 72.1, 72.4, 188/72.6, 72.7, 72.9, 343, 71.4, 18 R, 18 A, 72.2, 342, 152, 106 F, 106 A, 366; 192/70.23, 93 A

[56] References Cited

U.S. PATENT DOCUMENTS

| | | | |
|---|---|---|---|
| 3,915,262 | 10/1975 | Klaue | 188/72.6 X |
| 4,159,754 | 7/1979 | Airheart et al. | 188/72.6 X |
| 4,383,593 | 5/1983 | Micke | 188/72.6 X |
| 4,391,351 | 7/1983 | Jirousek et al. | 188/72.7 X |

Primary Examiner—Andres Kashnikow
Assistant Examiner—Robert J. Oberleitner
Attorney, Agent, or Firm—Oblon, Fisher, Spivak, McClelland & Maier

[57] ABSTRACT

A disc brake for service combined with parking operation is provided which includes a cylinder component, a shaft to be braked, a stator impossible to rotate relative to the cylinder component but possible to move axially relative to the shaft, a friction disc impossible to rotate relative to the shaft but possible to move axially relative to the shaft, a piston slidably engaged to the cylinder component and allowing the stator to frictionally engage the friction disc by a fluid pressure, a plate located at an end of the piston on the side opposed to the side facing the stator and the friction disc, the plate being rotatable by an exterior force, and a ball ramp mechanism provided between the piston and the plate.

3 Claims, 1 Drawing Sheet

DISC BRAKE FOR SERVICE COMBINED WITH PARKING OPERATION

FIELD OF THE INVENTION

The present invention relates to a large-sized disc brake for service combined with parking operation wherein a large-sized piston working by a hydraulic pressure as a service brake and a pressure plate provided with a steel ball mechanism as a parking brake are put unitedly in a cylinder. A shaft for output passes through the central portion of the brake.

BACKGROUND OF THE INVENTION

Conventionally, in the disc brake (for example, one disclosed in U.S. Pat. No. 3,101,813), it is general that the service and parking brake are operated by a mechanical brake utilizing steel balls. However, a disc brake with such structure has a shortcoming in that it cannot be used in a situation requiring large capacity.

OBJECT OF THE INVENTION

The invention was made for ameliorating the shortcoming described above.

SUMMARY OF THE INVENTION

The foregoing object has been attained by making a large-sized disc brake for service combined with parking operation characterized in that the service brake is constructed so that a stator and a friction disc are fitted to a shaft for output passing through respective central portions of a hydraulic cylinder. A piston is accommodated therein through the seal, and the stator and the friction disc are allowed to frictionally engage to cause the driving of piston by a hydraulic input. The parking brake is constructed at the same time so that as a pressure plate through which the output shaft passes is provided at an end portion of the piston. Steel balls are allowed to lie between the pressure plate and the cylinder, which alienate both of them with the rotary movement of the pressure plate. The stator and the friction disc are allowed to frictionally engage due to the rotary movement of the pressure plate by a mechanical input.

DETAILED DESCRIPTION OF THE INVENTION

Figure 1:
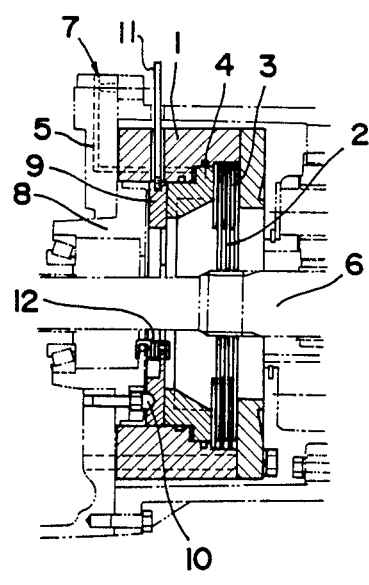
FIG. 1 is a cross section of the necessary portions of the disc brake in relation to an example of the invention.
Figure 2:
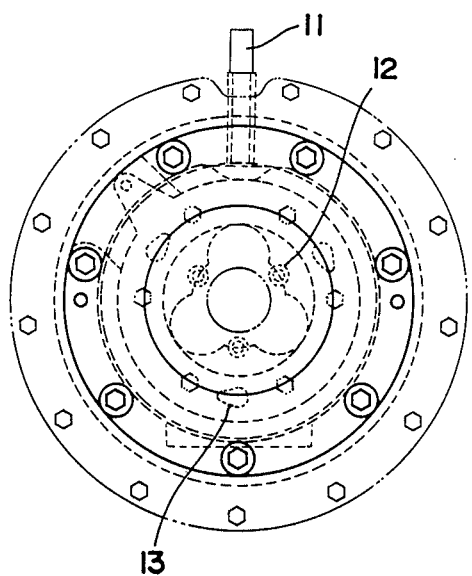
FIG. 2 is a ground plan of the same for illustration.

In following, the invention will be illustrated in detail based on an example shown in the drawings.

EXAMPLE

In a cylinder (1) fixed to the body of a car, a friction disc (2) provided with a frictional material of sintered metal, a stator (3), and a piston (4) are put together. The shape of the piston (4) is stepwise. Its pressing face on the side of the stator (3). The friction disc (2) has the same large diameter. The back face of the piston (4) on the opposite side has a small diameter. The stepped portion of the piston (4) is slidably engaged to a stepped portion of the cylinder (1). A hydraulic path (5) passes through the cylinder (1) and has an opening at the stepped portion of the piston (4).

The friction disc (2) is impossible to move in a direction of rotation relative to a shaft for output (6) and possible to move slidably axially relative to the shaft for output (6). Also, the stator (3) is impossible to move in a direction of rotation relative to the cylinder (1) and free to move slidably axially relative to the shaft for output (6). Hence, when a hydraulic pressure (7) is applied to the hydraulic path (5), the piston (4) presses the stator (3) and the friction disc (2) between the front face of the cylinder (1). Consequently, the cylinder (1), the friction disc (2), and the stator (3) are frictionally engaged to exert a braking force on the shaft for output (6). Thus, the service brake is operated.

On the other hand, a pressure plate (9) rotatably engaged to the small diameter portion of the cylinder (1) is fitted between a supporting component (8) fixed to the rear face of the cylinder (1) and the back face of the piston (4). Between the pressure plate (9) and the supporting component (8), steel balls (10) inserted into tapered grooves (13) provided on the pressure plate (9) and the supporting component (8) are kept. Two tapered grooves (13) and the steel balls (10) constitute a so-called ball ramp mechanism known widely.

The cylinder (1), the piston (4), the pressure plate (9), and the supporting component (8) described above are all in circular shape. The central portion is hollow, and the shaft for output (6) passes through the hollow portion.

When a mechanical input is given to a lever (11) fixed to the pressure plate (9), the pressure plate (9) moves rotatively against a pull spring (12) and the steel balls (10) are pushed up in the tapered grooves (13) to press the pressure plate (9) in front. As a result, the piston (4) is also pressed in front, and the stator (3) and the friction disc (2) engage frictionally to exert a braking force on the shaft for output (6). Thus, the parking brake is operated.

As described, the invention has advantages in that a service brake exerting a large reaction force can be provided from the facts that a large-sized piston is used for the service brake and the central portion of the brake has a hollow structure, which allows the shaft to pass through the central portion of the brake. At the same time, the parking brake is built-in to make it possible to be used as a united structure.

What is claimed is:

1. A disc brake for service combined with parking operation, said disc brake comprising:
   (a) a shaft for output;
   (b) a friction disc mounted on said shaft for output, said friction disc being axially movable relative to said shaft for output but being nonrotatable relative to said shaft for output;
   (c) a cylinder surrounding said shaft for output;
   (d) a stator surrounding said shaft for output in axially abutting relationship to said friction disc, said stator being axially movable relative to said shaft for output and said cylinder but being nonrotatable relative to said cylinder;
   (e) an axial abutment surface in said cylinder;
   (f) a piston slidably movable in said cylinder in position to grip said friction disc and said stator between said piston and said axial abutment surface;
   (g) means for applying fluid pressure to said piston to cause said piston to grip said friction disc and said stator between said piston and said axial abutment surface;
   (h) a pressure plate surrounding said shaft for output on the side of said piston opposite to said stator and said friction disc, said pressure plate being rotatable relative to said piston and being in contact with the adjacent face of said piston;
(i) a pull spring operatively connected to said pressure plate to bias it toward an unactuated position;
(j) a lever operatively connected to said pressure plate such that actuation of said lever causes said pressure plate to rotate against the bias of said pull spring; and
(k) a ball ramp mechanism operatively connected to the side of said pressure plate opposite to said piston such that rotation of said pressure plate caused by actuation of said lever causes said pressure plate to bear directly against the adjacent face of said piston, which in turn causes said friction disc and said stator to be gripped between said piston and said abutment surface, thereby exerting a braking force on said shaft for output.

2. A disc brake as recited in claim 1 wherein:
(a) said cylinder and said piston have matching steps and
(b) said pressure plate is rotatably engaged to the small diameter portion of said cylinder.

3. A disc brake as recited in claim 2 wherein said pressure plate is located between said piston and a supporting component fixed to said cylinder.

* * * * *